United States Patent
Sakakibara et al.

(10) Patent No.: US 6,553,652 B2
(45) Date of Patent: *Apr. 29, 2003

(54) FORCE CONTROLLING ROBOT

(75) Inventors: Shinsuke Sakakibara, Komae (JP); Yoshihisa Furukawa, Yamanashi (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,902

(22) Filed: May 10, 1999

(65) Prior Publication Data

US 2002/0056181 A1 May 16, 2002

(51) Int. Cl.[7] .................................................. B25J 9/00
(52) U.S. Cl. .............................. 29/709; 29/713; 29/714; 901/34
(58) Field of Search .................... 29/407.01, 407.05, 29/407.09, 407.1, 464, 468, 702, 709, 710, 713, 714, 806; 901/34

(56) References Cited

U.S. PATENT DOCUMENTS

| | | | |
|---|---|---|---|
| 3,824,674 A | * 7/1974 | Inoyama et al. | 29/407.1 |
| 4,707,907 A | * 11/1987 | Ivanov | 29/464 |
| 4,924,419 A | 5/1990 | McIntyre et al. | |
| 5,207,554 A | * 5/1993 | Asakawa et al. | 901/34 |
| 5,373,747 A | * 12/1994 | Ogawa et al. | 73/862.581 |
| 5,619,782 A | * 4/1997 | Tanaka et al. | 29/407.1 |

FOREIGN PATENT DOCUMENTS

| | | |
|---|---|---|
| EP | 09136279 | 5/1997 |
| EP | 0884141 A1 | 12/1998 |
| EP | 11095822 | 9/1999 |
| WO | WO-9203769 A1 * | 3/1992 ................ 901/34 |

OTHER PUBLICATIONS

"Automated Assembly With Systems Having Significant Manipulator and Part Location Errors", Erik Vasler, et al, 1987 IEEE.

"Requirements for Robot Assisted Disassembly of Not Appropriately Designed Electronic Products: Lessons from First Studies", Alexandra Weigl, 1994 IEEE.

* cited by examiner

Primary Examiner—I Cuda-Rosenbaun
Assistant Examiner—Jermie E. Cozart
(74) Attorney, Agent, or Firm—Staas & Halsey LLP (57) ABSTRACT

A force-controlling robot having a function of drawing a fitting part from a receiving part. A fitting part held by a robot hand is moved form an approach start position in a set approach direction under speed and force control. When the fitting part comes in contact with a receiving part and a reaction force thereof exceeds a set threshold value, the fitting part is moved under speed and force control with the set target speed and force and in the set inserting/fitting direction so as to perform fitting. If stoppage occurs before the fitting is completed, the fitting part is moved under speed and force control in the set drawing direction and with the set target drawing speed and drawing force, to draw the fitting part from the receiving part. As the drawing operation is automatically performed, restoration is automatically made without manual operation even if stoppage occurs in the fitting operation. Further, assembled parts can be automatically disassembled.

3 Claims, 7 Drawing Sheets

FIG. 3a (APPROACH)

FIG. 3b (FITTING)

FIG. 3c (CLOGGING)

FIG. 3d (DRAWING)

FIG. 4a

FIG. 4b (HOLDING)

FIG. 4c (DRAWING)

FIG. 7

FORCE CONTROLLING ROBOT

BACKGROUND OF THE INVENTION

1. Field of the Invention

The present invention relates to an industrial robot, and particularly to a robot having a function of drawing a fitting part from a receiving part.

2. Description of Related Art

It has already known to automatically fit a workpiece in another workpiece using a force-controlling robot capable of operating under force control. Further, a method of fitting a fitting part in a receiving part with their phases matched with each other using the force-controlling robot is disclosed in Japanese Laid-Open Patent Publication No. 9-136279.

There is a case where the fitting operation is not completed because of an inappropriate fitting state in performing the fitting operation using the force-controlling robot. In such case, conventionally, an error is indicated during the fitting operation and the robot is stopped, and then a restoration operation is performed manually.

Further, conventionally, when an assembly constituted by a plurality of parts is to be disassembled, drawing a fitted part out of the assembly to be disassembled is performed manually and is not automatically performed using a robot.

In the operation of fitting a workpiece into another workpiece using a force-controlling robot, if the fitting operation is not completed and the robot stops due to an error occurring in the fitting operation, it takes time and labor to perform the manual restoration and such manual restoration is very cumbersome to cause lowering of the overall operation efficiency.

Further, it is desirable if the operation of drawing a fitted part out of the assembly can be automatically performed by a robot instead of the manual operation when disassembling an assembly constituted by a plurality of parts.

SUMMARY OF THE INVENTION

An object of the present invention is to provide a force-controlling robot having a function of drawing a fitting part from a receiving part and a fitting and drawing method using the force-controlling robot.

A force-controlling robot of the present invention has a force sensor at a wrist portion thereof to insert a fitting part to be fitted into an object of fitting while performing a force control, and has a function of drawing the fitting part from the object of fitting by moving the fitting part in a direction opposite to an inserting direction when the fitting operation is not progressed by a predetermined distance or to a predetermined position within a predetermined time period. The moving of the fitting part in the direction opposite to the inserting direction can be achieved by changing parameters set for the fitting operation. The drawing operation and the fitting operation are repeatedly executed when the fitting operation is not completed.

Further, a force-controlling robot of the present invention has a function of holding a fitted part in the assembled parts by a robot hand while performing a force control using the force sensor, and drawing the fitted part out of the assembled parts while performing the force control using the force sensor.

Furthermore, the present invention provides a fitting/drawing method in which the drawing operation is performed in the middle of the fitting operation when the fitting operation does not progress, and a drawing/disassembling method for drawing a fitted part out of assembled parts.

DETAILED DESCRIPTION OF THE PREFERRED EMBODIMENTS

Figure 1:
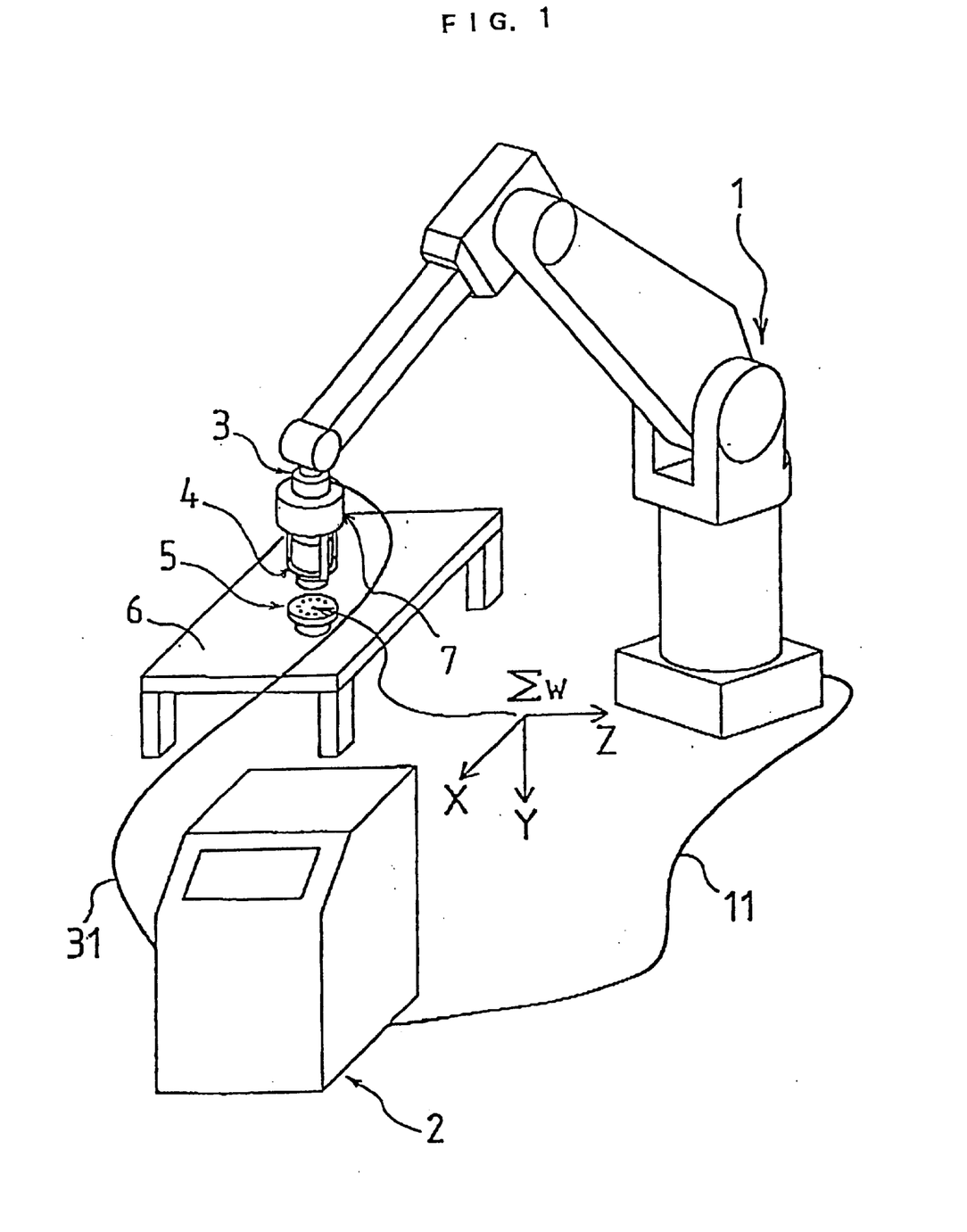
FIG. 1 is a schematic illustration of an embodiment of the present invention.

FIG. 1 is a schematic illustration of an embodiment of the present invention. Reference numeral 1 denotes a force-controlling robot body, which is connected with a robot controller 2 by a cable 11. The structure of the robot (body) 1 itself is not particularly different from that of a conventional one. The robot controller 2 may be the same as a conventionally used one, except for software means for performing a process described later.

At the end of a wrist of the force-controlling robot 1 is attached a six-axes force sensor 3 which can detect translation force in the directions of three axes perpendicular to each other and moment around those three axes (the force and moment will be refereed to as "six-axes force"). Reference numeral 31 denotes a cable which connects the force sensor 3 and the robot controller 2.

Parts which are objects of operation are denoted by reference numerals 4, 5. In the present embodiment, an operation of fitting a fitting part 4, which is held by a hand 7 attached to an end of a wrist of the robot 1 with the six-axes force sensor 3 interposed therebetween, into a receiving part 5 placed on a work table 6 is performed, or an operation of drawing a fitted part 4 from the receiving part 5 in an assembly is performed. A tool center point is set at a center of an end face of the fitting part 4.

Further, it is assumed that a work coordinate system (user coordinate system) $\Sigma w$ is set so that a direction of an insertion axis (direction in which the robot 1 moves when the fitting part 4 is inserted into an opening of the receiving part 5) agrees with a direction of the Y-axis. Further, it is assumed that the receiving part 5 supplied on the work table 6 is positioned with a posture matched with the direction of the insertion axis (the Y-axis direction).

Figure 2:
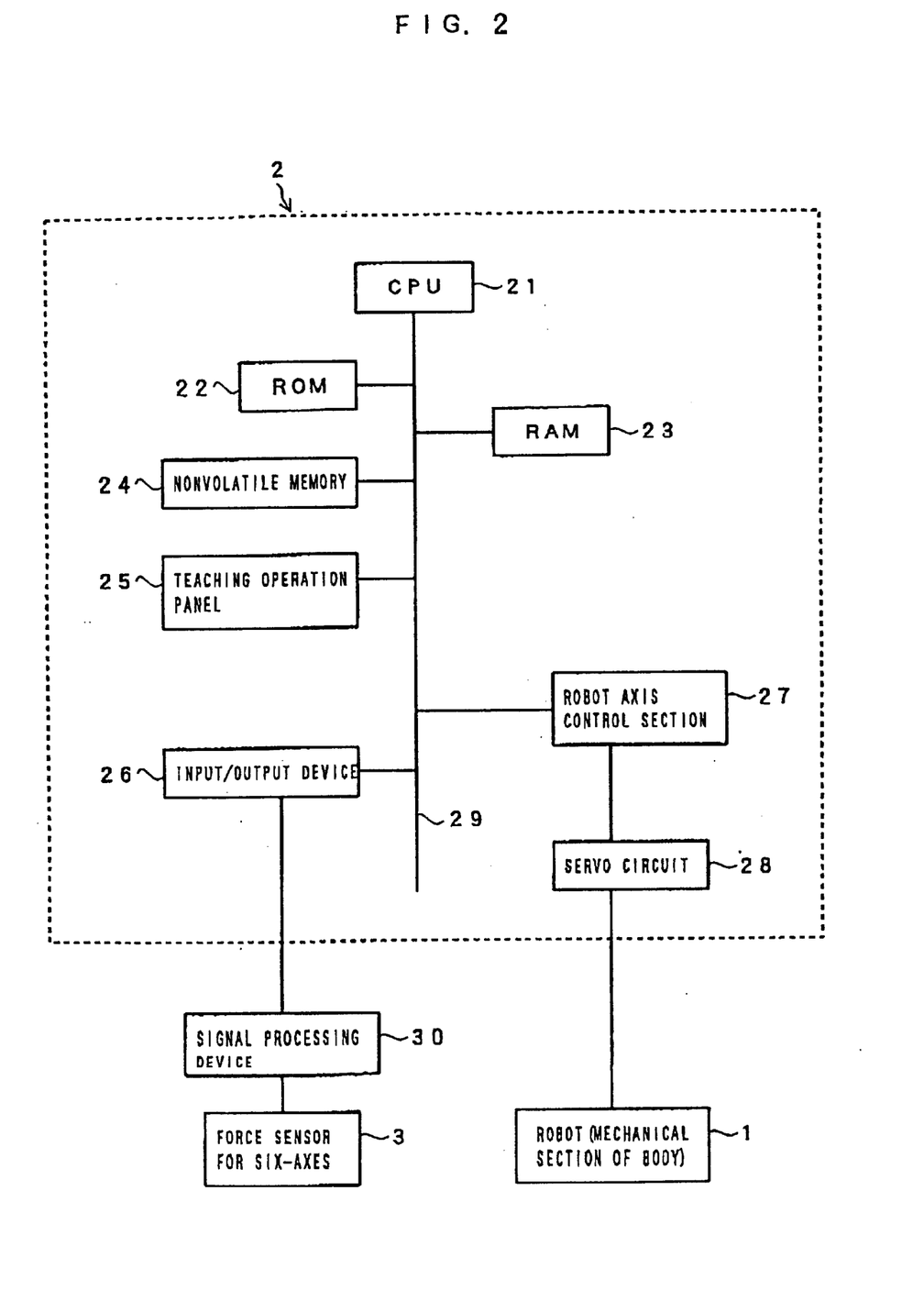
FIG. 2 is a block diagram showing structure of a robot controller used in the embodiment of FIG. 1.

FIG. 2 is a block diagram showing schematic structure of a control system including the robot controller 2 and the six-axes force sensor 3 shown in FIG. 1. As shown in FIG. 2, the control system comprises of the robot controller 2, the robot (mechanical section of the body) 1 which operates under the force control by the robot controller 2, the six-axes force sensor 3 which is supported on the mast at the distal end of the arm of the robot body, and a signal processing unit 30 for processing signals detected by the six-axes force sensor 3.

The robot controller 2 includes a central processing unit (CPU) 21. To the CPU 21, there are connected via a bus 29, a memory 22 in the form of a ROM, a memory 23 in the form of a RAM, a nonvolatile memory 24, a teaching operation panel 25 with a keyboard for inputting various commands and set values regarding robot teaching and operation of other sections of the system, an input/output device 26 which functions as an interface between the CPU 21 and the signal processing unit 30, and a robot axis control section 27 for controlling axes of the robot body 1 through a servo circuit 28 for drivingly controlling servomotors.

The six-axes force sensor 3 may be that of known structure, for example, including a plurality of bridge circuits each comprising a strain gauge and being driven with alternate current by an oscillator. The six-axes force sensor 3 sends detection signals indicating components of six-axes force to the signal processing unit 30.

The outline of signal processing by the signal processing unit 30 is as follows: The detection signals sent from the six-axes force sensor 3 are amplified by a differential amplifier, synchronously rectified to be dc signals, and then supplied to a multiplexor in the signal processing unit. The multiplexor successively outputs the detection signals indicating components of six-axes force to the input/output device 26 through a sample-hold circuit and an A/D converter, in accordance with a control signal received from the CPU 21 of the robot controller 2 through the input/output device 26.

The CPU 21 successively stores the detection signals in a predetermined area in the nonvolatile memory 24. Those stored detection signals of the six-axes force sensor 3 are used for force control (impedance control) of the robot.

The ROM 22, the RAM 23 and the non-volatile memory 24 are used for storing a system program for controlling operation of the robot controller 2 itself, a program for impedance control (described later), a program for control of transmitting signals between the robot controller 2 and the signal processing unit 30 and set values for various processing, in addition to the above described detection data from the six-axes force sensor 3.

The above mentioned set values include data of a transformation matrix for transformation between a sensor coordinate system set in the six-axes force sensor 3 and a rectangular coordinate system set in the robot as well as parameters for the force control (impedance control).

Next, description will be made of an operation of fitting/drawing a fitting part 5 into a receiving part 6 and an operation of drawing a fitting part 5 from a receiving part 6 by using the above described force-controlling robot.

FIGS. 3a to 3d are schematic illustrations showing the fitting/drawing operation in which a drawing operation is performed in a fitting operation when the fitting operation is not progressed.

Figure 3A:
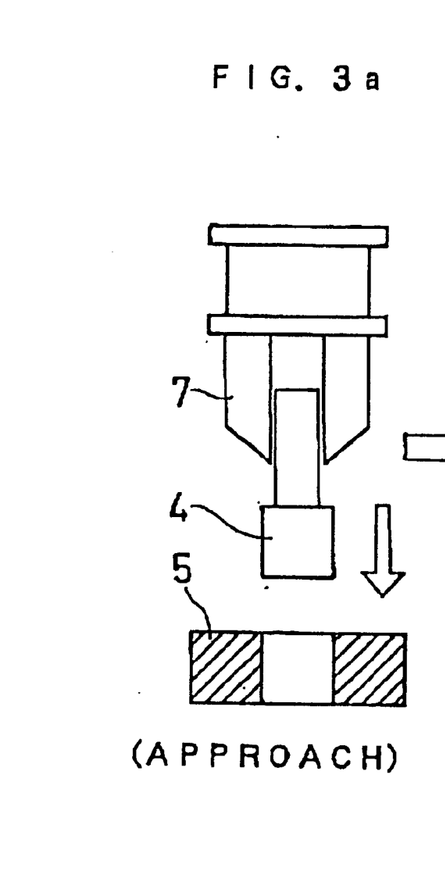
FIGS. 3a to 3d are illustrations explaining how a part is fitted in and drawn according to the present invention.
Figure 3B:
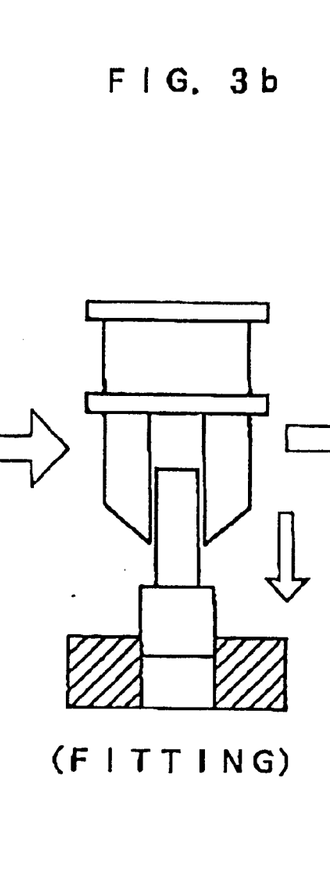
Figure 3C:
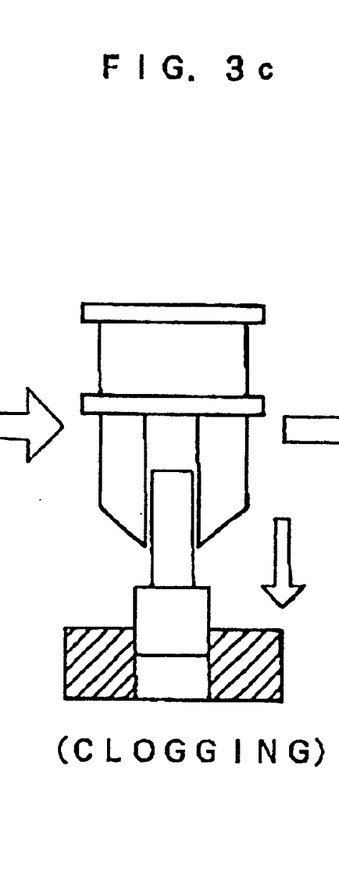

After positioned at an approach start position for fitting, the robot starts an approach operation under speed and force control in accordance with an approach direction (fitting direction, i.e., the Y-axis direction in FIG. 1), a pressing target force and an approach speed which are predetermined by parameters (see FIG. 3a). When the fitting part 4 comes in contact with the receiving part 5 and a reaction force thereof exceeds a threshold value set by parameter, it is determined that the fitting part 4 comes in contact with the receiving part 5, and the procedure proceeds to a fitting operation as shown in FIG. 3b. In the fitting operation, the fitting part 4 is moved under speed and force control in accordance with the inserting/fitting direction (the Y-axis direction), a pressing target force and ae speed which are set by parameters.

Figure 3D:
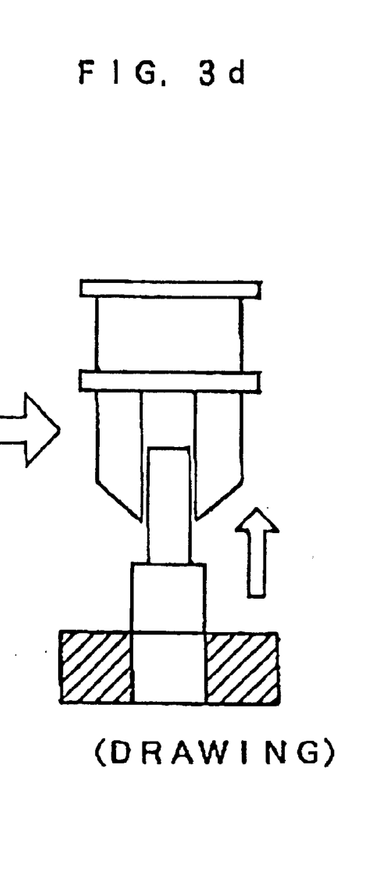

During the fitting operation, if the fitting operation does not progress for some reason, in this embodiment, if movement of a set fitting distance is not achieved and the movement stops in the middle of the fitting (see FIG. 3c), the fitting part 4 is moved in a direction opposite to the inserting direction up to the approach start position under the speed and force control in accordance with the speed and the target force for the fitting operation, to thereby draw the fitting part 4 from the receiving part 5 (FIG. 3d).

The movement shown in FIGS. 3a–3d are performed predetermined times until the fitting operation completed.

Figure 4A:
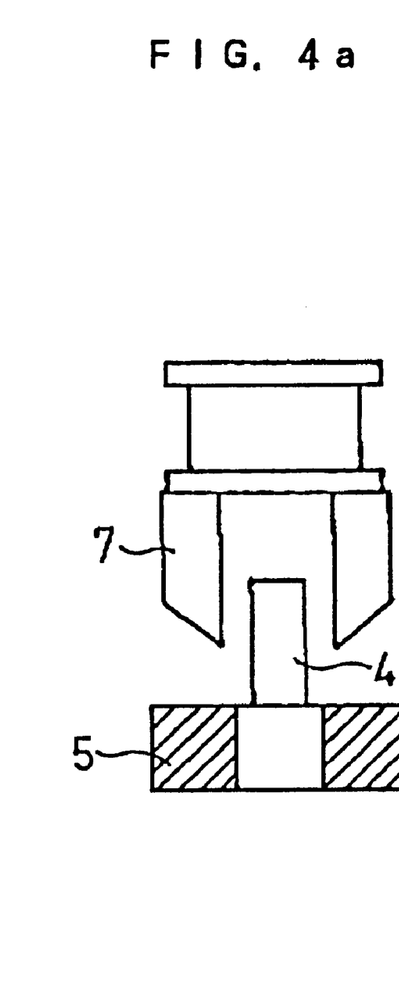
FIGS. 4a to 4c are illustrations explaining how a fitted part included in an assembly is drawn and separated from a receiving part included in the assembly according to the present invention.
Figure 4B:
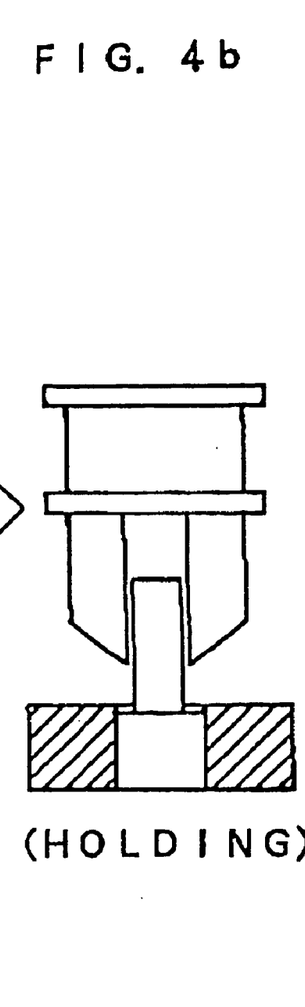
Figure 4C:
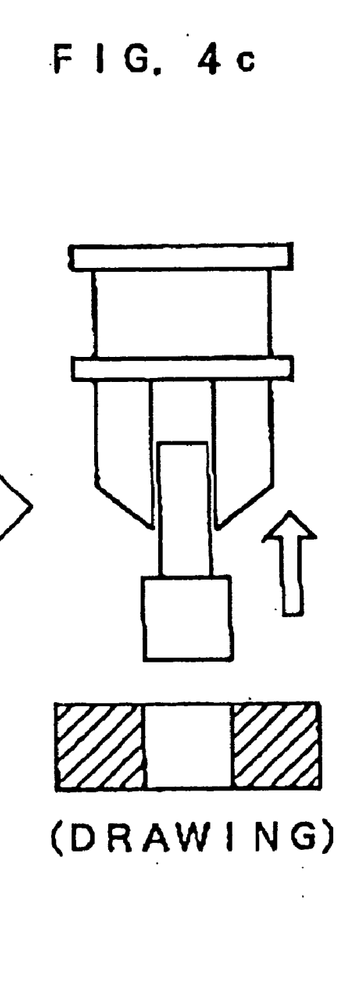

FIGS. 4a–4c are illustrations of an operation of drawing a fitted part 4 from a receiving part 5 so as to disassemble assembled parts.

First, the hand 7 is moved to a position where it can hold the fitted part 4 (FIG. 4a) and then the hand 7 is closed to hold the fitted part 4 under the force control at an offset force predetermined by parameter as a target force (see FIG. 4b). So as not to damage the fitted part 4 or the receiving part 5 with the hand 7 inappropriately holding the fitted part 4 to apply large force to the fitted part 4, the fitted part 4 is held by the hand 7 under the force control with the offset force set by parameter as the target force. Then, the fitted part 4 is moved in a set drawing direction at a set speed under the force control with a drawing force set by parameter as the target force, to draw the fitted part 4 from the receiving part 5. The drawing/disassembling operation is terminated when the fitted part 4 is moved by a set amount of drawing movement (FIG. 4c).

The above description is made for explaining an outline of the fitting operation and the drawing operation performed when stoppage occurred in the fitting operation, and the drawing operation for disassembling an assembly.

Figure 6:
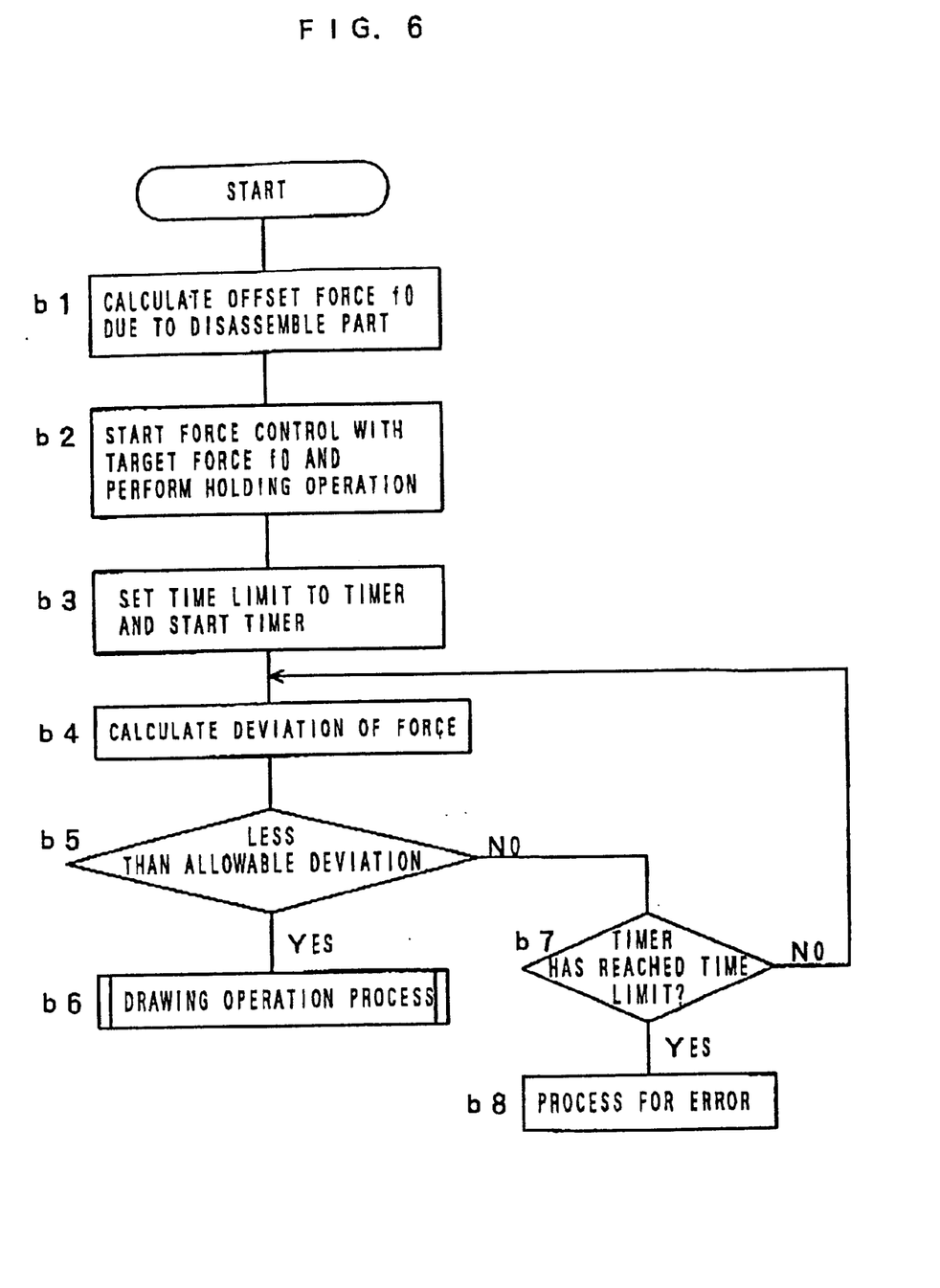
FIG. 6 is a flowchart of a process of drawing a fitted part from a receiving part in order to disassemble assembled parts according to an embodiment of the present invention.
Figure 7:
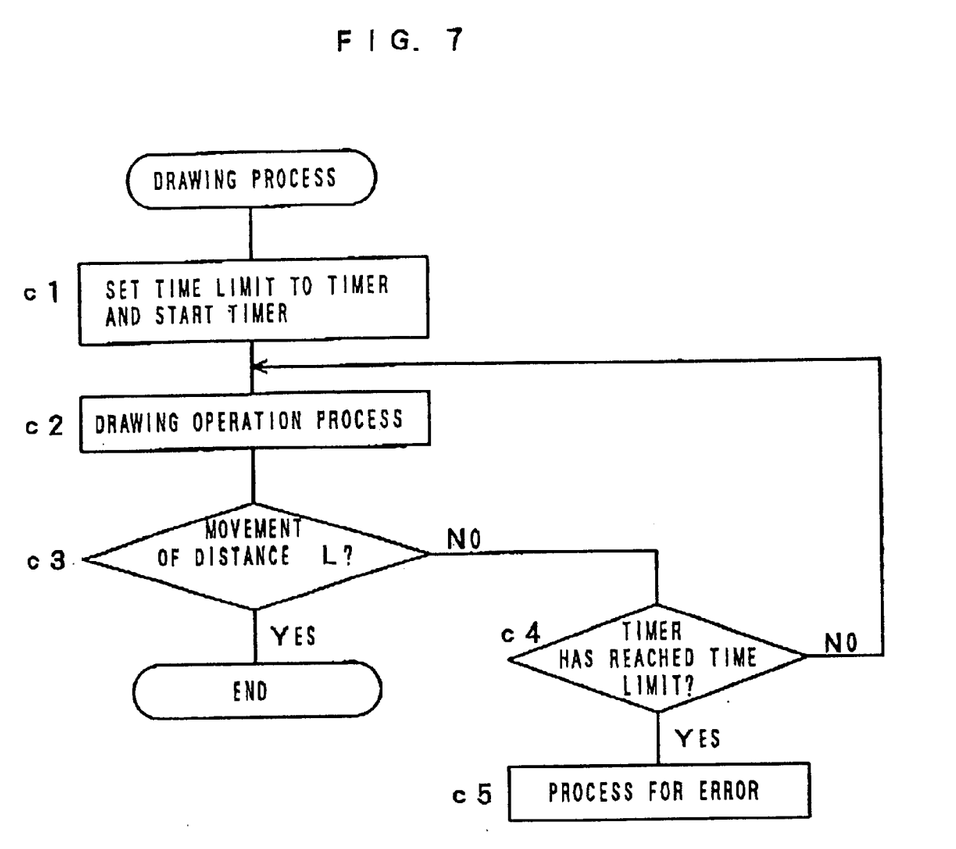
FIG. 7 is a flowchart of a process of drawing a part according to an embodiment of the present invention.

Next, processing to be performed by the CPU 21 of the robot controller 2 in performing the above described fitting/drawing operation and drawing operation for disassembling sing the force-controlling robot will be described referring to flowcharts of FIGS. 5–7.

First, values of various parameters for robot operation are set and stored in the nonvolatile memory 24. Among parameters to be set for the fitting operation and the drawing operation which is performed when stoppage occurred during the fitting operation, parameters for determining approach operation are an inserting direction (in the example of FIG. 1, the Y-axis direction in the work coordinate system), approach speed, target force for force control with reference to six axes (the X—, Y—, Z-axes in the work coordinate system of FIG. 1 as directions of translation, and the X—, Y—, Z-axes as axes of rotation) (in the example of FIG. 1, since the insertion is performed in the Y-axis direction, the target force needs to be determined only with reference to the Y-axis direction; values of the target force with reference to the X-axis direction and the Z-axis direction and with reference to the axes of rotation are "0"), target speed for approach operation (in the example of FIG. 1, the target speed needs to be determined only with reference to the Y-axis direction; values of the target speed with reference to the X-axis direction and the Z-axis direction and with reference to the axes of rotation are "0"), and a threshold of reaction force due to contact of a fitting part with a receiving part which is used in determining whether the approach is completed or not.

In the present embodiment, an impedance control method is adopted as a method of the force control. As parameters for the impedance control, values representing magnitude of springs, magnitude of mass (inertia), and magnitude of dampers are predetermined. Further, whether the force control by the impedance control method should be made effective or not is set with reference to each of the six axes (in the example of FIG. 1, since the approach movement comprises only translation in the inserting direction, the force control is made effective only with reference to the Y-axis as a direction of translation; it is made ineffective with reference to the other axes). Similarly, parameters indicating whether a motion command should be generated or not are set with reference to each of the six axes (in the example of FIG. 1, a motion command is made effective only with reference to the Y-axis as a direction of translation; it is made ineffective with reference to the other axes). Details of the impedance control method are disclosed in the aforementioned Japanese Laid-Open Patent Publication No. 9-136279.

Parameters to be set for the fitting operation include an inserting direction (in the example of FIG. 1, the Y-axis direction), amount of movement from an approach start position to a fitting completion position (hereinafter referred to as "amount of fitting movement"), target force for fitting operation (in the example of FIG. 1, a specific value is chosen as the target force with reference to the Y-axis direction; values of the target force with reference to the X-axis direction and Z-axis direction and with reference to the axes of rotation are "0"), target speed (in the example of FIG. 1, the target speed needs to be set only with reference to the Y-axis direction, values of the target speed with reference to the X-axis direction and the Z-axis direction and with reference to the axes of rotation are "0"), impedance parameters (magnitude of springs, magnitude of mass, magnitude of dampers), parameters indicating whether the force control by the impedance control method should be made effective or not with reference to each of the six axes (in the example of FIG. 1, the force control is made ineffective only with reference to the Y-axis as an axis of rotation; it is made effective with reference to the other axes), and parameters indicating whether a motion command should be outputted or not with reference to each of the six axes (in the example of FIG. 1, a motion command is made ineffective only with reference to the Y-axis as an axis of rotation; it is made effective with reference to the other axes).

The approach operation and the fitting operation are the same as conventional approach and fitting operations performed under force control by the impedance control method. Also the way of determining parameters is the same as a conventional way. In the above description, only the typical parameters have been mentioned.

In the present invention, if the fitting operation does not progress because of clogging, etc. in the fitting operation, the fitting operation is stopped and the procedure proceeds to the drawing operation. In the present embodiment, as a way of determing the progressing state, it is determined that the fitting operation does not progress because of clogging, etc. if the fitting operation is not completed after a set time period elapsed by measuring time from the start of the fitting operation. For this determination, a limit of time period of the fitting operation is set by parameter.

Also a drawing direction, target speed, target force, a drawing completion position, etc. for the drawing operation need to be set. These parameter data can be set, but they do not always need to be set specifically, because in the case of the drawing operation in the fitting operation, the drawing direction is the direction opposite to the inserting direction, and the target speed and the target force may be the same as those for the fitting operation except that they have the opposite direction. In an example described later, the drawing direction, the target speed, and the target force for the drawing operation are determined to be reverse to the fitting direction, the target speed, and the target force for the fitting operation, and the drawing completion position is determined to coincide with the approach start position.

For the drawing operation for disassembling, however, a drawing direction, drawing target force, target speed, amount of drawing movement (amount of movement to a position corresponding to an approach start position) need to be set specifically. Further, as in the fitting operation, impedance parameters, parameters indicating whether the force control by the impedance control method should be made effective or not with reference to each of the six axes, and parameters indicating whether a motion command should be outputted or not with reference to each of the six axes need to be set.

Furthermore, there is a risk of applying large force to the fitted part 4 to damage the fitted part 4 or the receiving part 5 by inappropriate holding of the fitted part 4 when holding the fitted part 4 by the hand 7 at the beginning of the operation of drawing the fitted part 4 from the receiving part 5, and a force offset amount of the held part for the gravity can not be known before fitting unlike the case of ordinary fitting operation. Therefore, in order to calculate the force offset amount as target holding force, mass and position of the center of gravity of the fitted part 4 to be disassembled are set in advance. Furthermore, allowable deviation of force offset used as target force for detecting completion of the holding, and a time limit of the holding operation are also set by parameter.

As described above, values of various parameters are predetermined, and then a robot operation program is executed.

First, process of performing the drawing operation when the fitting operation is not completed because of stoppage in the fitting operation and will be described referring to a flowchart of FIG. 5. In the present embodiment, when stoppage occurs during the fitting operation, the fitting and drawing operation is repeated and the number of repetitions is also set by parameter.

The CPU 21 of the robot controller 2 reads blocks of an operation program one by one in order. Based on a command in a read block, the CPU 21 drives servomotors for axes of the robot body 1 to thereby drive the robot body 1. In this way, the robot is positioned at the approach start position from which the robot should start the approach operation, and then the CPU 21 reads the next block. If the next block contains a "force fitting command", the CPU 21 starts a process of FIG. 5.

The CPU 21 makes the robot move, under speed and force control, the fitting part 4 held by the hand 7 from the approach start position in the predetermined inserting direction (in the example of FIG. 1, the Y-axis direction) at the predetermined approach speed. In the example of FIG. 1, the force control in this phase is performed in accordance with the target force which is determined only with reference to the inserting direction, that is, the Y-axis translation direction. The force control is made ineffective with reference to the X-axis direction and the Z-axis direction and with reference to the axes of rotation (signals with reference to those directions and axes of rotation sent from the force sensor 3 are not utilized). A motion command is generated only with reference to the Y-axis translation direction. A motion command is not generated with reference to the X-axis direction and the Z-axis direction and with reference to the axes of rotation. Thus, the robot is controlled to maintain a fixed posture (Step a1).

When the fitting part 4 comes in contact with the receiving part 5 and force detected by the force sensor 3 reaches or exceeds the predetermined threshold, the CPU 21 makes the robot end the approach operation, sets the predetermined time limit to a timer, and starts the timer (Step a2). At the same time, the CPU 21 makes the robot start the fitting operation (Step a3). Specifically, the CPU 21 makes the robot move the fitting part in the predetermined inserting direction (the Y-axis direction) under speed and force control performed in accordance with the predetermined speed and the predetermined target force. In this phase, a motion command is not generated with reference to the X-axis direction and the Z-axis direction which are directions perpendicular to the inserting direction, and the force control is performed in accordance with the target force which is "0" with reference to those axes. Further, a motion command is not generated with reference to the Y-axis as an axis of rotation (it is to be noted that the insertion is performed in the Y-axis direction), and the robot is controlled to maintain a fixed posture with reference to those directions. Further, force control is so performed that moment around the X-axis and the Z-axis which are perpendicular to the axis of insertion may be "0".

The above described process for approach operation and fitting operation is the same as that of a known conventional case, except that the timer is prepared and started when the approach operation ends Next, the CPU 21 judges whether amount of movement from the approach start position reaches the predetermined amount of fitting movement (amount of movement between the approach start position and the fitting completion position) (Step a4). If it does not reach the predetermined amount, the CPU 21 judges whether the time measured by the timer has reached the predetermined time limit (Step a6). If the measured time has not reached the time limit, the CPU 21 returns to Step a3. Thus, the CPU 21 repeats Steps a3, a4, a6 to make the robot continue the fitting operation.

When it is found that the robot has traveled the predetermined amount of fitting movement and the fitting operation has been completed, the CPU 21 proceeds from Step a4 to Step a5 and sets a counter C (described later) in a state of "0" and makes the robot end the fitting operation.

If it is not found that the robot has traveled the predetermined amount of fitting movement but the time measured by the timer has reached the predetermined time limit, the CPU 21 proceeds from Step a6 to Step a7, detects the current position (drawing start position) and obtains the distance L between the current position and the approach start position. Then, the CPU 21 proceeds to Step a8, and executes a subroutine shown in FIG. 7 for mailing the robot perform the drawing operation. The CPU 21 sets the predetermined drawing time limit to the timer, and starts the timer (Step c1). The direction of and the target speed and the target force for the drawing operation are those reverse to the direction of and the target speed and the target force for the fitting operation which have been predetermined. The CPU 21 makes the robot perform the drawing operation under the force and speed control similar to that in the fitting operation (Step c2).

Specifically, the drawing operation can be achieved by inversing the inserting direction which is set to agree with the Y-axis direction in the work coordinate system Σw with the target speed and the target force unchanged, or by inversing signs of the target speed and the target force with the inserting direction unchanged.

Then, the CPU 21 judges whether the robot has traveled the movement distance L obtained in Step a7 (Step c3). If it has not traveled the movement distance L, the CPU 21 judges whether the timer reached the drawing time limit (Step c4). If it has not reached the time limit, the CPU 21 returns to Step c2. Thus, the CPU 21 repeats Steps c2, c3, c4 to make the robot continue the drawing operation.

Figure 5:
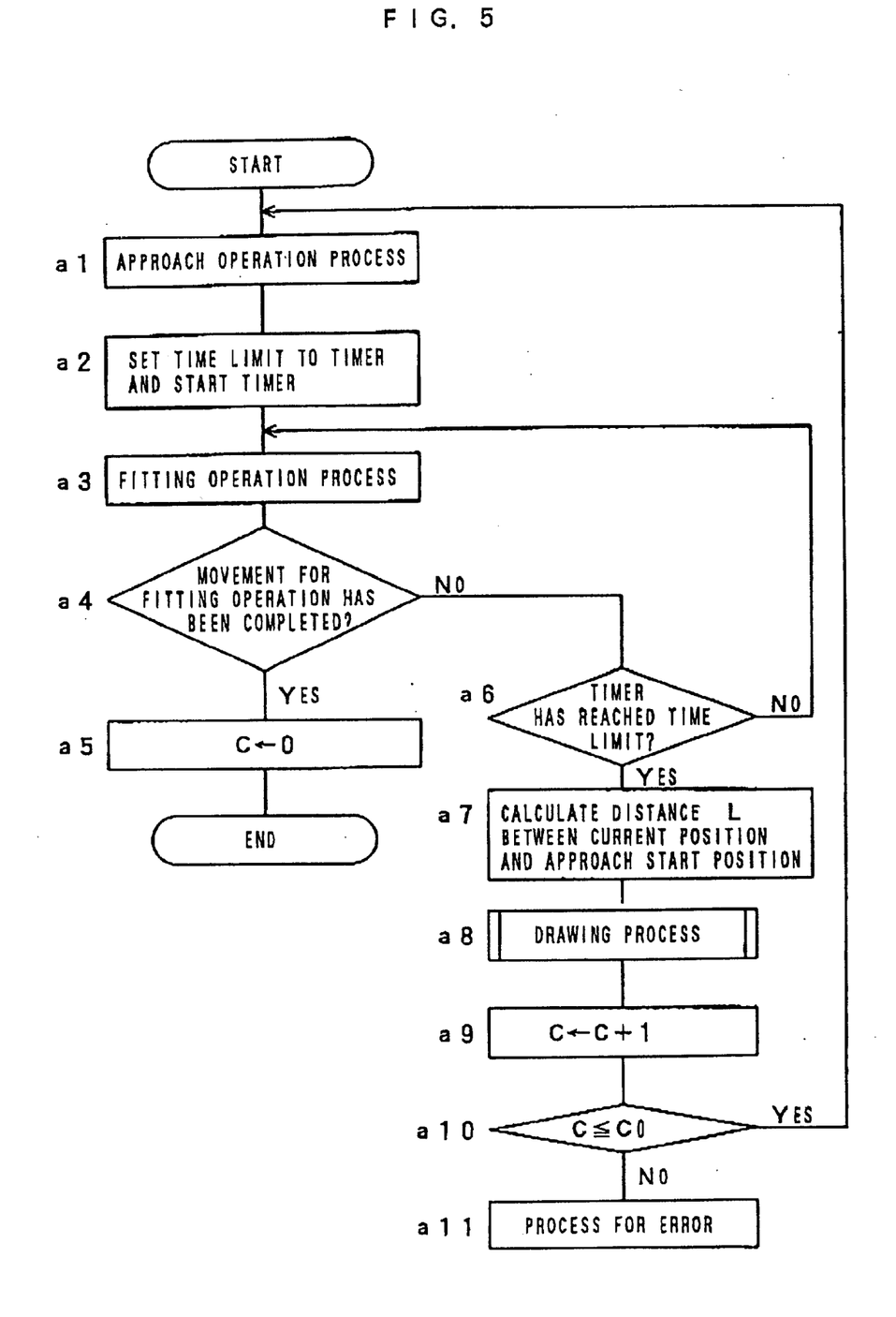
FIG. 5 is a flowchart of a process of fitting and drawing a part according to an embodiment of the present invention.

During the drawing operation, if it is found in Step c3 that the robot has traveled the movement distance L, the CPU 21 makes the robot end the drawing operation and proceeds to Step a9 in FIG. 5. If the robot has not traveled the movement distance L but the timer has reached the time limit (Step c4), the CPU 21 makes the robot stop the drawing operation and performs a process of dealing with a error such as indicating a drawing error (Step c5).

When the drawing is completed and the CPU 21 proceeds to Step a9, the CPU 21 adds "1" in the counter C which is provided for counting how many times the fitting operation has been performed (The counter C is initially set in a state of "0" when power goes on). Then, the CPU 21 judges whether the value stored in the counter C reaches the predetermined number C0 of times to retry the fitting operation (Step c10). If it does not reach the predetermined number C0, the CPU returns to Step a1 and makes the robot start the fitting operation again.

The CPU 21 makes the robot repeat the fitting and drawing operation until the number of repetitions reaches the predetermined number of times to retry the fitting operation, unless it is found in Step a4 that the robot has traveled the predetermined amount of fitting movement. When it is found in Step a4 that the robot has traveled the predetermined amount of fitting movement, the CPU 21 sets the counter C in a state of "0" and makes the robot end the fitting operation. On the other hand, if the value stored in the counter C reaches the predetermined number C0 of times to retry the fitting operation (Step a10), the CPU 21 makes the robot stop the fitting and drawing operation and performs a process of dealing with an error such as indicating a fitting error (Step a1).

The embodiment for performing the drawing operation when stoppage occurs during the fitting operation for some reason and the fitting operation is not completed has been described above. Next, the process of drawing a fitted part 4 from a receiving part 5 in an assembly constituted by a plurality of parts, and separate them from each other will be described with reference to a flowchart of FIG. 6.

The CPU 21 reads blocks of a robot operation program one by one in order. When the robot is positioned at a position where the robot can hold the fitted part 4 (a position shown in FIG. 4a) and then the CPU 21 reads a block containing a drawing command, the CPU 21 starts a process of FIG. 6.

First, the CPU 21 calculates offset force f0 from the position of the center of gravity and the mass of the to-be-separated fitted part (Step b1). Here, the position of the center of gravity and the mass of the fitted part are given in advance as described above Next, the CPU 21 makes the hand 7 start closing operation under force control using the calculated offset force f0 as target force (Step b2), sets a predetermined hand closing time limit to a timer and starts the timer (Step b3). Then, the CPU 21 calculates deviation of force detected by the force sensor 3 from the target force f0 (Step b4), and judges whether the deviation of force is within a predetermined allowable range (Step b5). If it is not less than the allowable deviation, the CPU 21 judges whether the timer has reached the time limit (Step b7). If the timer has not reached the time limit, the CPU repeats Steps b4, b5, b7 to make the hand continue holding operation. Since the holding operation is performed under force control performed in accordance with the target holding force f0, if the hand strikes one side of the fitted part 4, large force will not be applied to the fitted part 4, and therefore the fitted part 4 or the receiving part 5 will not be damaged.

If the deviation of force does not become less than the allowable deviation and the timer has reached the time limit (Step b7), the CPU 21 makes the hand stop the holding operation and performs a process of dealing with an error such as indicating a holding error (Step b6).

If the calculated deviation of force comes in the allowable range before the timer reaches the time limit, the CPU 21 makes the robot start the drawing operation (Step b6). The drawing operation is the same as that performed in the process of the fitting operation, and the CPU 21 executes the subroutine shown in FIG. 7. It is only to be noted that in the drawing operation for disassembling, the amount L of drawing movement is predetermined by parameters. Therefore, in Step c3, whether the robot has traveled the predetermined amount L of drawing movement is judged.

In the present invention, it is possible to draw a fitting part from a receiving part and separate them from each other under force control. Therefore, even if stoppage occurred during fitting operation and the fitting operation is not completed, a fitting part can be automatically drawn from a receiving part, without requiring manual operation. The fitting and drawing operation can be repeated automatically. Further, when disassembling assembled parts, a fitted part is drawn from a receiving part to be separated from each other. This makes it possible to automatically disassemble assembled parts without requiring manual operation. Thus, the present invention improves the operation efficiency and the production efficiency.

What is claimed is:

1. A force-controlling robot, having a force sensor at a wrist thereof, for fitting a fitting part into an object of fitting, comprising:

fitting operation control means for moving the fitting part with respect to the object of fitting to insert the fitting part into the object of fitting while performing a force control using the force sensor;

determining means for determining whether or not the insertion of the fitting part is completed within a predetermined time period; and drawing operation control means for moving the fitting part in a direction opposite to the fitting direction to draw the fitting part out of the object of fitting while performing the force control using the force sensor in response to said determining means determining that the fitting operation is not completed within the predetermined time period, wherein the drawing operation and the fitting operation are repeatedly executed until said determining means determines that the fitting operation is completed within the predetermined time period.

2. A force-controlling robot according to claim 1, wherein said fitting operation control means does not start the fitting operation when the drawing operation and the fitting operation are repeated a set number of times.

3. A force-controlling robot, having a force sensor at a wrist thereof, for fitting a fitting part into an object of fitting, comprising:

fitting operation control means for moving the fitting part with respect to the object of fitting to insert the fitting part into the object of fitting while performing a force control using the force sensor;

determining means for determining whether or not the insertion of the fitting part operation is completed within a predetermined time period; and drawing operation control means for moving the fitting part in a direction opposite to the fitting direction to draw the fitting part out of the object of fitting while performing the force control using the force sensor in response to said determining means determining that the fitting operation is not completed within the predetermined time period, wherein said drawing operation control means stops the drawing operation when the drawing operation is not completed within a set time interval.

* * * * *